Patented Jan. 30, 1951

2,539,806

UNITED STATES PATENT OFFICE 2,539,806

TRI-SUBSTITUTED GLYCOLS AND METHOD OF MAKING SAME

Ernst Bergmann, London, England, assignor to Polymerisable Products Limited, London County, England, a British company No Drawing. Application December 23, 1946, Serial No. 718,109

2 Claims. (Cl. 260—635)

Glycols are important as starting materials for plasticisers, as components of anti-freeze mixtures and either as such or in form of derivatives as insecticides, and for other uses.

The present invention consists in a process for the production of tertiary-secondary glycols of the following general formula (1) 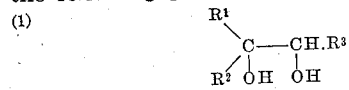

in which $R^1$, $R^2$ and $R^3$ are monovalent hydrocarbon radicals, and $R^3$ is preferably methyl; $R^1$ and $R^2$ can be separate alkyl groups or with the adjacent C atom can form part of a hydroaromatic ring.

The present invention also includes processes for the production of esters of the above-defined glycols.

The present invention consists in a process for the production of such tertiary-secondary glycols from the corresponding hydroxy-ketones of the general formula (2) 

In the investigation of this reaction the unexpected observation has been made that only under strictly defined conditions, these hydroxy-ketones could be hydrogenated to the desired glycols. Under mild conditions of temperature and pressure one or even the main reaction taking place is hydrogenolysis, that is replacement of the tertiary hydroxyl group by hydrogen, followed or accompanied by a reduction of the keto-group to the secondary alcohol group. Under mild conditions, therefore, secondary alcohols of the general formula (3) 

are formed to a considerable extent. Temperatures of 75–125° and preferably 80–90° C. have to be used and pressures between 100 and 1000 and preferably pressure between 500 and 1000 pounds per sq. in. are employed. Then, the hydroxy-ketones are transformed quickly and with substantially quantitative yield into the desired tertiary-secondary glycols.

The lower members of the series are soluble in water and are isolated preferably by salting out with potassium carbonate or sodium carbonate. The concentrated aqueous carbonate solution is, of course, evaporated to dryness and the residue is re-used for subsequent batches. Instead of the salting-out, other methods can be conveniently used for the isolation of those members of the group which are miscible with water, e. g. extraction with water-immiscible selective solvents, adsorption on specific adsorbents, or extractive or azeotropic distillation.

The new glycols form colorless viscous liquids which are miscible or soluble in water and equally in most organic solvents. Whilst the first member of the group, tri-methyl-glycol, is soluble in benzene and mixtures of benzene with petroleum hydrocarbons but not in petroleum hydrocarbons themselves, the higher representatives of the group are miscible also with aliphatic petroleum hydrocarbons.

The substance in which $R^1$ and $R^3$ are both $CH_3$ and $R^2$ is isobutyl, is similar in most of its properties to the ethyl-hexane-diol which has recently found industrial application.

The difference in reactivity between the tertiary and the secondary hydroxyl groups makes selective reactions possible. Acylation, e. g., attacks the secondary hydroxyl group more easily than the tertiary. Especially with relatively high-molecular acid chloride, mono-esters are formed; and the same is true for the "Umesterung" of e. g. methyl esters with the glycols. Acetylation with acetyl chloride gives a diacetyl derivative even under relatively mild conditions.

A modification of the above method permits the preparation of the isomeric mono-esters in which the tertiary hydroxyl group is acylated. This is due to the fact that it is possible to prepare the acyl derivative of the above formulated hydroxy-ketone, e. g.

(4) 

e. g., by acylation of the corresponding alkyl-butynols.

(5) 

and subsequent hydration of the triple bond. If these esters of the hydroxy-ketones are hydrogenated under the above defined operating conditions, those mono-esters of the glycols are obtained which are acylated in the tertiary hyroxyl group. They can, of course, then further be acylated to the corresponding di-acyl derivatives by the usual methods; the second acyl can be either the same as or different from the first one.

Dehydration of the glycols by catalytic methods in the vapour phase, e. g. in presence of activated alumina, leads successively to the corresponding allyl alcohol by splitting off the tertiary hydroxyl group, and to the corresponding diene by splitting off the secondary hydroxyl group too. The first (tertiary) molecule of water is split off at a temperature of 280–320° C., while for the catalytic formation of a diene a temperature of about 400° C. is required. The reaction is always accompanied by a pinacolonic rearrangement which leads by elimination of one molecule of water to a ketone of the general formula (6) 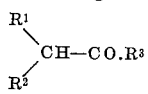

From the tri-methyl-glycol, e. g., methyl-isopropyl-ketone is obtained. Separation of the isomers formed, e. g. by passing the vapor over activated alumina at 300° C., viz. methyl-isopropyl-ketone and methyl-isopropenyl-carbinol, can be carried out by usual methods.

The rearrangement to ketones also takes place if the glycols are treated with the usual reagents bringing about such pinacolonic rearrangements as e. g. acids. Distillation of the glycols with small traces of iodine gives again mixtures of these ketones and the isomeric α,β-unsaturated secondary allyl alcohols.

In view of the ease with which the glycols are converted into the corresponding saturated ketones by means of acidic reagents, it is surprising that the mixture of the glycols with aldehydes, when heated in presence of phosphoric acid, forms easily and in good yields the corresponding cyclic acetals (7) 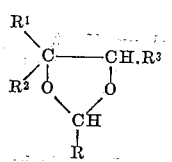

These acetals are colorless liquids which have high solvent power for a variety of organic substances.

Examples of such substances are:

(a) 2.4.4.5 tetramethyl-1.3 dioxolane

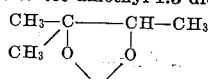

(b) 2.4.5-trimethyl-4-isobutyl-1.3-dioxolane

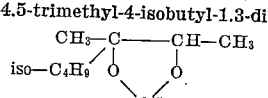

(c) 2.5-dimethyl-4-pentamethyleno-1.3-dioxolane

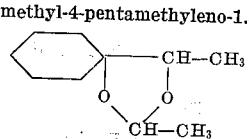

In these substances the substituents are as follows:

(a) $R^1$, $R^2$, $R^3$ and $R$ are methyl
(b) $R^1$, $R^3$ and $R$ are methyl and $R^2$ is isobutyl
(c) $R^3$ and $R$ are methyl, $R^1$ plus $R^2$ pentamethyleno chain.

is here the divalent cyclohexylidene radical.

EXAMPLES

[All parts are by weight]

*Example 1.*—51 parts 3-methyl-3-butanol-2-one dissolved in 200 parts water were hydrogenated at 70–80° C. in presence of 5 parts of Raney nickel and with an initial pressure of 200 lbs. The reaction took 30 minutes. The reaction product was salted out from the filtered solution by means of potassium carbonate and was distilled (1) 45°/70 mm.: 7.9 parts, biphasic.
(2) Up to 70°/13 mm.: 6.3 parts.
(3) 75–78°/13 mm.: 38 parts.

The third fraction is the desired trimethyl-glycol, an odorless, colorless viscous liquid, miscible with water, alcohol, ether, benzene, but not with petroleum ether. Cut (1) was saturated with potassium carbonate and the oil so obtained (1.9 parts) was combined with (2) and redistilled. 3.4 parts of an oil, B. P. 115°, and 3.8 parts glycol were thus obtained. The former is isopropyl-methyl-carbinol, for which the literature gives B. P. 114°. Trimethyl-glycol, yield, 41.8 parts=82%. With 500 lbs. pressure, approximately 100% yield is secured.

*Example 2.*—51 parts 3-methyl 3-butanol-2-one in 200 parts water were hydrogenated at 70° C. and an initial pressure of 1000 lbs. The temperature rose to 80° C. and the absorption was completed in 20 minutes. Potassium carbonate was added to saturate the water and the aqueous solution separated. This gave 50.5 parts trimethyl-glycol, B. P. 64/5 mm., without any head or tail fraction.

If the initial hydrogen pressure had been only 200 lbs., the reaction would be much slower and the yield of trimethyl glycol substantially less.

*Example 3.*—510 parts methyl-butanolone in 500 parts water were hydrogenated starting at room temperature and an initial pressure of 1100 lbs.

The amount of the Raney nickel could be 25 to 30 parts. The temperature rose slowly to 40° C. The total reaction time was 18 hours. Potassium carbonate treatment gave 499.5 parts trimethyl-glycol.

*Example 4.*—71 parts 3-isobutyl-3-butanol-2-one in 160 parts methanol were hydrogenated at room temperature and an initial pressure of 200 lbs. in presence of Raney nickel. The reaction lasted 8 hours. The solvent was distilled off and the residue fractionated under 13 mm. pressure.

(1) Up to 65°: 5 parts; density, 0.8585; refractive index, 1.4169.
(2) 65–80°: 10.2 parts; density, 0.9074; refractive index, 1.42285.
(3) 80–90°: 4.6 parts; discarded.
(4) 95–96°: 40.2 parts.

Fraction (4) is the desired 3.5-dimethyl-hexane-2.3-diol, a colorless oil, miscible with water and many organic solvents, including petroleum ether. Yield, 57%; density, 0.9157; refractive index, 1.4455.

Analysis:

Calc. for $C_8H_{18}O_2$: C, 66.0; H, 12.3.
Found: C, 66.3; H, 12.3.

This diol has the formula

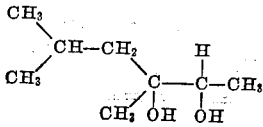

The preceding fractions (1, 2 and 3) contained 3.5-dimethyl-2-hexanol.

*Example 5.*—72 parts isobutyl-butanolone in 80 parts isopropyl alcohol were hydrogenated at 70° C. and 1000 lbs. initial pressure in the presence of Raney nickel. The reaction took 2 hours and distillation gave 70 parts of the desired glycol, B. P. 84–85°/7 mm.

*Example 6.*—72 parts isobutyl-butanolone in 80 parts isopropyl alcohol were hydrogenated at 110° C. and 1300 lbs. initial pressure in the presence of Raney nickel. The reaction required only 1½ hours. At 50 mm. pressure, the 3.5 dimethyl-hexane-2.3-diol boiled at 125–128°, and a head fraction was obtained, which after treatment with potassium carbonate, gave a second crop of the glycol. Total, 69 parts.

*Example 7.*—50 parts trimethyl-glycol and 1 part iodine were heated in a column with partial take-off. The top tempertaure was not allowed to rise above 90° C. 31 parts of an oil and 6.5 parts water distilled over. The oil boiled at 94–100°/760 mm.; density, 0.8132; refractive index, 1.3912. It contains 27.4% carbonyl and has a bromine number of 20.2. This means that it contains 84% methyl-isopropyl-ketone and 11% isopropenyl-methyl-carbinol.

The presence of the ketone was proven by treating 6.4 parts of the oil in 40% acetic acid with 12.4 parts p-nitro-phenylhydrazine. The solid reaction product was recrystallized from methanol and formed beautiful orange-brown crystals, of M. P. 109–111°, as indicated in the literature.

*Example 8.*—If one heats 3.5-dimethyl-hexane-2.3-diol with 0.5% iodine, the theoretically expected quantity of water distills over quickly and the reaction product boils between 122 and 156°/760 mm. From the bromine number (87.5), one can conclude that it consists of 70% 3-isobutyl-3-butene-2-ol and 30% 3.5-dimethyl-2-hexanone.

*Example 9.*—180 grams trimethyl-glycol were passed over 180 c. c. of activated alumina at 275° C. within 2 hours. The reaction product (175.5 grams) was fractionated. 41 grams of the glycol were recovered, and a bi-phasic head fraction of B. P. 85–130° was obtained which amounted to 122 grams. After treatment of this fraction with potassium carbonate, the oil was redistilled and gave after a small head, which was discarded, 58.5 grams of a water-white oil.

Analysis of this oil:
　Calc. for $C_5H_{10}O$: C, 69.8; H, 11.7.
　Found: C, 68.4; H, 11.8; CO, 17.2%; bromine number 47.

As methyl-isopropyl-ketone has 32.6% CO and methyl-isopropenyl-carbinol has a bromine number of 186, one can conclude that the oil contains 52.7% of the ketone and 25.3% of the unsaturated alcohol.

The ketone was identified by means of its p-nitrophenylhydrazone, as described above.

*Example 10.*—The homogeneous mixture of 27 grams trimethyl-glycol, 8.8 grams paraldehyde and 0.4 c. c. of phosphoric acid (1.70) was boiled for 10 hours. 5 c. c. of water were formed. The product was repeatedly fractionated at atmospheric pressure and gave thus 16 grams 2.4.4.5-tetramethyl-dioxolan, B. P. 102–105°; density, 0.8508; refractive index, 1.3975.

Analysis:
　Calc. for $C_7H_{14}O_2$: C, 64.6; H, 10.8.
　Found: C, 65.1; H, 11.2.

*Formation of esters*

*Example 11.*—Diacetyl derivative of trimethyl-glycol. At 0° C., a solution of 79.2 grams acetyl chloride in 100 c. c. of chloroform was added to a solution of 52 grams trimethyl-glycol in 80 grams pyridine. The product was treated with sulfuric acid. This settled into two layers, and the chloroform layer was dried over calcium chloride. B. P. 62–63°/23 mm.; yield, 55.5 grams=60%. The diester so obtained has a fruity odor; density, 1.0126; refractive index, 1.42065.

Analysis:
　Found: C, 51.1; H, 8.8; saponification number, 541.
　Calc. for the monoester $C_7H_{14}O_3$: C, 57.5; H, 9.6; saponification number, 384. For the diester $C_9H_{16}O_4$: C, 57.5; H, 8.5; saponification number, 596.

*Example 12.*—11.5 parts 3.5-dimethyl-hexane-2.3-diol in 50 parts pyridine were added to 22.3 parts of the chloride of 3-cyclohexenecarboxylic acid in 37.5 parts chloroform. After 24 hours at room temperature, the mass was treated with dilute (e. g. 10%) $H_2SO_4$, washed with sodium carbonate solution and the chloroform distilled off. B. P. 135–137°/6 mm.; yield, 14.5 parts of the monoester; density, 1.0138; refractive index, 1.4741.

Analysis:
　Calc. for $C_{15}H_{26}O_3$: C, 70.9; H, 10.2.
　Found: C, 69.9; H, 10.0.

*Example 13.*—10 parts 3.5-dimethyl-hexane-2.3-diol in 50 parts pyridine were added to a solution of 22 parts of 1-methyl-3-cyclohexenoyl chloride in 37.5 parts chloroform. The treatment described in the foregoing example gave 12.5 parts of the monoester, B. P. 125–130°/6 mm.; density, 1.0274; refractive index, 1.4669.

*Example 14.*—In 34 parts trimethyl-glycol, 2 parts sodium metal were dissolved at 120° C. Then 100 parts methyl methacrylate and 5 parts hydroquinone were added and the thick mass was heated for 8 hours in a column with partial take-off, so that the top temperature never exceeded 65°, the boiling point of the azeotrope of methanol and methyl methacrylate, 16 parts by volume distillate were obtained, containing 12.5 parts by volume methanol which is the amount to be expected from 50% conversion (i. e. complete esterification of one hydroxyl group). The mixture was treated with dilute sulfuric acid and the organic product, after dilution with ether, dried over anhydrous magnesium sulfate and distilled. After removal (under 100 mm. pressure) of the excess of methyl methacrylate, the mono-methacrylate of the trimethyl-glycol boiled at 76–78°/6 mm.; 29.5 parts; density, 0.9945; refractive index, 1.44565. Yield, 52%.

*Example 15.*—Tertiary mono-acetyl derivative of trimethyl-glycol.

(a) 3-acetoxy-3-methyl-2-butanone. 51 parts of the acetyl derivative of methyl-butynol were added slowly with stirring to a mixture of 180 parts water, 32.4 parts concentrated sulphuric acid and 8 parts mercuric sulfate at 20° C. After 20 hours at room temperature, the supernatant oil (15.3 parts) was withdrawn, dried over calcium chloride and distilled. B. P. 51°/7 mm.; density, 0.94075; refractive index, 1.4096. It is the desired 3-acetoxy-3-methyl-2-butanone; yield, 26%.

Analysis:
 Calc. for $C_7H_{12}O_3$: C, 57.4; H, 8.3.
 Found: C, 57.7; H, 9.0.

The aqueous layer was steam-distilled and the distillate salted out with potassium carbonate. 21 parts of an oil were obtained which was methyl-butanolone. Yield, 51%. When the reaction mixture was boiled for 1 hour (instead of keeping it at room temperature), no oily layer was obtained and the water gave, in the manner described, 36 parts methyl-butanolone (yield, 87%).

(b) 33.2 parts 3-acetoxy-3-methyl-2-butanone in 160 parts methanol were hydrogenated at room temperature with Raney nickel as catalyst. The reaction product was distilled under 13 mm. pressure and gave 24.1 parts of the expected (tertiary) monoacetyl derivative of trimethyl-glycol; B. P. 62–63°. Density, 1.001; refractive index, 1.4165.

Analysis:
 Calc. for $C_7H_{14}O_3$: C, 57.5; H, 9.6.
 Found: C, 57.4; 57.9; H, 9.1; 9.2.

Analogously one can obtain from 1-(α-hydroxyethyl)-cyclohexanol the 2.5-dimethyl-4-pentamethylene-1.5-dioxolane, and from the corresponding cyclopentanone derivative the 2.5-dimethyl-4-tetramethylene-1.5-dioxolane, or from 1-tetralone the 2.5 - dimethyl - 4 - benzo - pentamethyleno-1.3-dioxolane

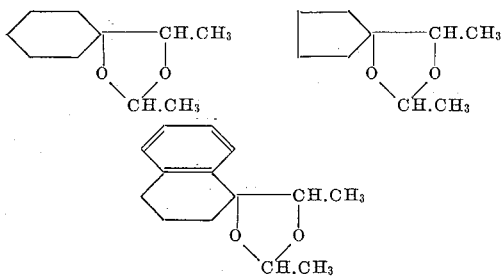

The reaction taking place in the process of Example 10, is as follows:

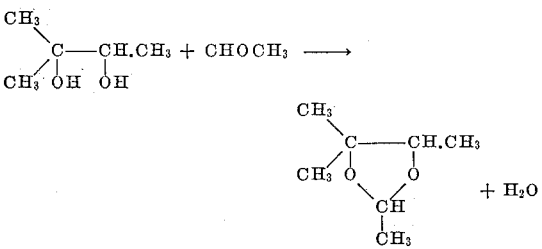

The esters produced in the processes of Examples 11, 12, 13, 14 and 15 are the following:

(11) 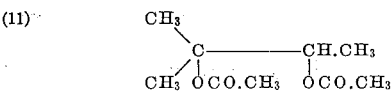

(12) 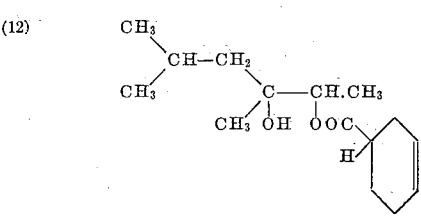

(13)

(14)

(15b)

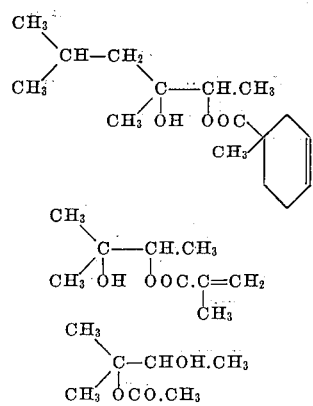

It is to be understood that the present invention is not restricted to the treatment of the hydroxy-ketones mentioned above and in the examples. As examples of other hydroxy-ketones suitable for treatment by the process described, I mention the following: diethyl-acetyl carbinol, dipropyl-acetyl carbinol, ethyl-benzyl-acetyl carbinol, methyl-benzyl-acetyl carbinol, methyl-cyclo-pentyl-acetyl carbinol, such list being illustrative and in no sense limitive.

I claim:

1. A process which comprises adding a hydrogenation catalyst to a 3-hydroxy-2-ketone containing three hydrocarbon radicals, subjecting such mixture in the presence of water in the amount of several fold the amount of said ketone, to hydrogen under a pressure of about 500 to about 1000 lbs., while such mixture is at a temperature of about 70 to about 125° C., and thereafter adding an alkali metal carbonate in such amount as to give a substantially saturated solution with the water present, whereby the organic reaction product can separate from the aqueous solution.

2. The herein described diols having the general formula

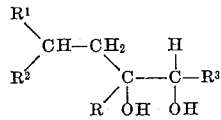

in which $R^3$ and R are alkyl groups, and $R^1$ and $R^2$ are hydrocarbon groups, and in which a carbon atom of $R^1$, the carbon atom adjacent thereto and a carbon atom of $R^2$ may constitute three adjacent carbon atoms in a hydroaromatic ring.

ERNST BERGMANN.

REFERENCES CITED

The following references are of record in the file of this patent:

UNITED STATES PATENTS

| Number | Name | Date |
|---|---|---|
| 2,035,314 | Hansley et al. | Mar. 24, 1936 |
| 2,079,403 | Hansley | May 4, 1937 |
| 2,370,779 | Conaway | Mar. 6, 1945 |
| 2,384,955 | Moyle | Sept. 18, 1945 |
| 2,407,205 | Wilkes | Sept. 3, 1946 |
| 2,409,441 | Metzger | Oct. 15, 1946 |

FOREIGN PATENTS

| Number | Country | Date |
|---|---|---|
| 110,625 | Australia | May 30, 1940 |